(12) United States Patent  (10) Patent No.: US 8,273,206 B2
Kuriyama et al.  (45) Date of Patent: Sep. 25, 2012

(54) METHOD FOR CONTINUOUSLY FORMING COMPOSITE MATERIAL SHAPE MEMBER HAVING VARIED CROSS-SECTIONAL SHAPE

(75) Inventors: Shuntaro Kuriyama, Tokyo (JP); Tsunehiko Nakano, Tokyo (JP)

(73) Assignees: Jamco Corporation, Tokyo (JP); Jamco Technical Center Co., Ltd., Tokyo (JP)

( * ) Notice: Subject to any disclaimer, the term of this patent is extended or adjusted under 35 U.S.C. 154(b) by 0 days.

(21) Appl. No.: 12/611,348

(22) Filed: Nov. 3, 2009

(65) Prior Publication Data

US 2010/0116421 A1 May 13, 2010

(30) Foreign Application Priority Data

Nov. 12, 2008 (JP) .................... 2008-289566

(51) Int. Cl.
*B29C 43/26* (2006.01)
*B29C 70/34* (2006.01)
*B29C 70/50* (2006.01)

(52) U.S. Cl. ......... 156/245; 156/202; 264/280; 264/319
(58) Field of Classification Search .................. None
See application file for complete search history.

(56) References Cited

U.S. PATENT DOCUMENTS

| 4,720,255 | A | * | 1/1988 | Mittelstadt | ................. | 425/394 |
| 2001/0007684 | A1 | | 7/2001 | Kasai et al. | | |
| 2001/0035249 | A1 | * | 11/2001 | Kondo et al. | ................. | 156/65 |
| 2008/0217806 | A1 | | 9/2008 | Aijima | | |

FOREIGN PATENT DOCUMENTS

JP 3400399 B2 4/2003
JP 2008-213311 A 9/2008
* cited by examiner

*Primary Examiner* — Justin Fischer
*Assistant Examiner* — Philip N Schwartz
(74) *Attorney, Agent, or Firm* — Westerman, Hattori, Daniels & Adrian, LLP

(57) ABSTRACT

The invention provides a method for continuously forming a composite material shape member having a varied cross-sectional shape. A C-shaped movable mold 100 having a center portion 110 and both end portions 120 and 130 with a smaller surface dimension than the center portion is prepared, and prepreg sheets are laminated in advance to the both end portions 120 and 130 and the center portion 110, then these plies of prepreg sheets are denoted as the laminate 320, so that the whole body has a flat planar surface. Prepreg sheets 300 are drawn out from rolls 210 and 220 and passed through a preforming device 230 so that a C-shaped member 310 having a uniform cross-sectional shape is preformed. The movable mold 100 with pre-laminate 320 is superposed to the preformed member 310, which is passed through a hot press device, an after-cure furnace 260 where thermosetting of the member is completed, and then the movable mold 100 is removed to complete a formed product.

2 Claims, 5 Drawing Sheets

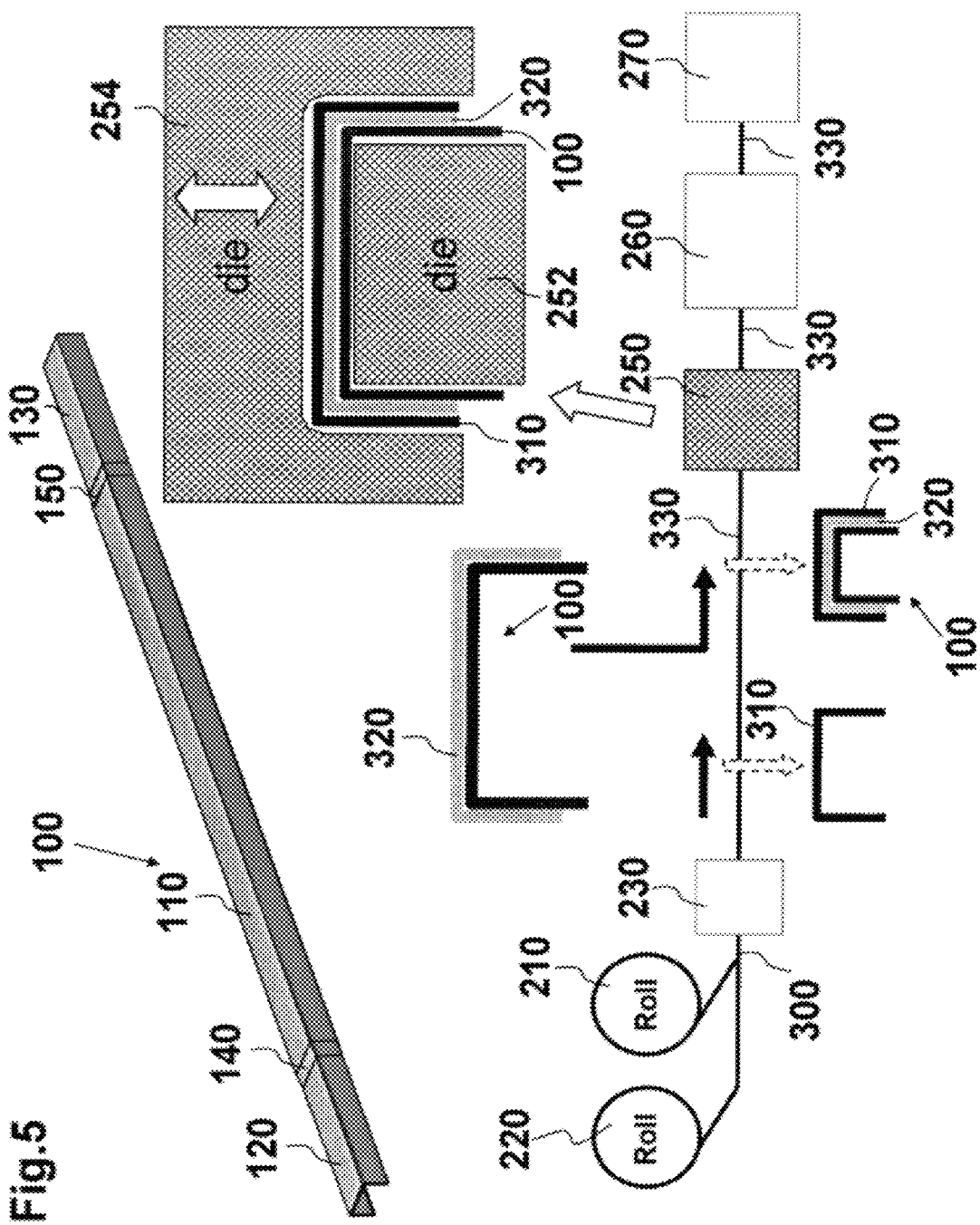

METHOD FOR CONTINUOUSLY FORMING COMPOSITE MATERIAL SHAPE MEMBER HAVING VARIED CROSS-SECTIONAL SHAPE

The present application is based on and claims priority of Japanese patent application No. 2008-289566 filed on Nov. 12, 2008, the entire contents of which are hereby incorporated by reference.

BACKGROUND OF THE INVENTION

1. Field of the Invention

The present invention relates to a method for continuously forming a composite material shape member having a varied cross-sectional shape, and a movable mold used for the method.

2. Description of the Related Art

An art is known for obtaining a formed product having a desired cross-sectional shape by heating and forming a prepreg material formed by impregnating long fibers such as carbon fibers and glass fibers with thermosetting resin such as epoxy resin and phenol resin. Carbon fibers and glass fibers have high strength per unit weight, and especially high tensile strength, so that when the fibers are laminated with the fiber directions disposed in the vertical, horizontal and oblique directions to form a composite material, the created product has light weight, high specific strength and high specific modulus, and they are widely applied in the field of aircrafts and industrial products.

The forming material is formed by laminating a large number of layers, each layer formed by arranging carbon fibers or glass fibers impregnated with thermosetting resin in parallel or by a woven cloth formed of these fibers, and if necessary, a roving of such fibers is arranged between the layers to create the forming material. As for the forming method and forming apparatus, a plurality of belt-like prepreg materials supplied via bobbins are heated and pressed via a heated upper die and a lower die of a hot press device by which the materials are formed into a desired cross-sectional shape, and thereafter, the formed member is completely cured in a cure furnace to be finished as a product. During the process, the formed member is moved within the apparatus by being continuously pulled via a puller device arranged at the lower-stream area of the apparatus.

Japanese patent No. 3400399 (patent document 1) filed by the present applicant discloses the above-described art.

By applying the disclosed art, the composite material can be formed continuously into an H-shaped member or the like, but the art cannot be applied to forming shape members having cross-sectional shapes varied in some areas.

Therefore, the present applicant proposes in Japanese patent application laid-open publication No. 2008-213311 (patent document 2) a method for continuously molding a composite material having stepwise cross-sectional thickness.

According to the art disclosed in patent document 2, prepreg peel plies are laminated on both sides of a prepreg laminated body, and after molding, the peel plies are peeled and removed in order to obtain a product having a varied cross-sectional thickness.

SUMMARY OF THE INVENTION

The present invention aims at solving the problems of the prior art by providing a method for continuously forming a composite material shape member having a varied cross-sectional shape without using peel plies, and a movable mold used for the molding method.

In order to achieve the above-mentioned object, the present invention provides a method for continuously forming a composite material shape member, the method comprising a step of preparing a movable mold with a mold portion having a cross-sectional shape corresponding to the cross-sectional shape of the shape member, wherein an inner surface thereof is formed of a flat plane and an outer surface thereof has a dimension varied in the longitudinal direction, a step of pre-laminating composite material prepreg sheets on the outer surface of the movable mold so that the surface of the whole sheets constitute a planar surface, a step of passing the prepreg sheets through a preforming device and forming a preform member having an even thickness, a step of overlapping to an inner side of the preform member the movable mold having a composite prepreg sheet laminated thereto in advance and subjecting the same to a hot press, a step of additionally heating the hot-pressed member in an after-cure furnace so as to complete thermosetting, and a step of removing the movable mold from the member having completed thermosetting.

As described, the present invention enables to form various composite material shape members having varied cross-sectional shapes using various movable molds.

BRIEF DESCRIPTION OF THE DRAWINGS

FIG. 5 is an explanatory view illustrating the forming method according to the present invention.

DETAILED DESCRIPTION OF THE PREFERRED EMBODIMENTS

Figure 1:
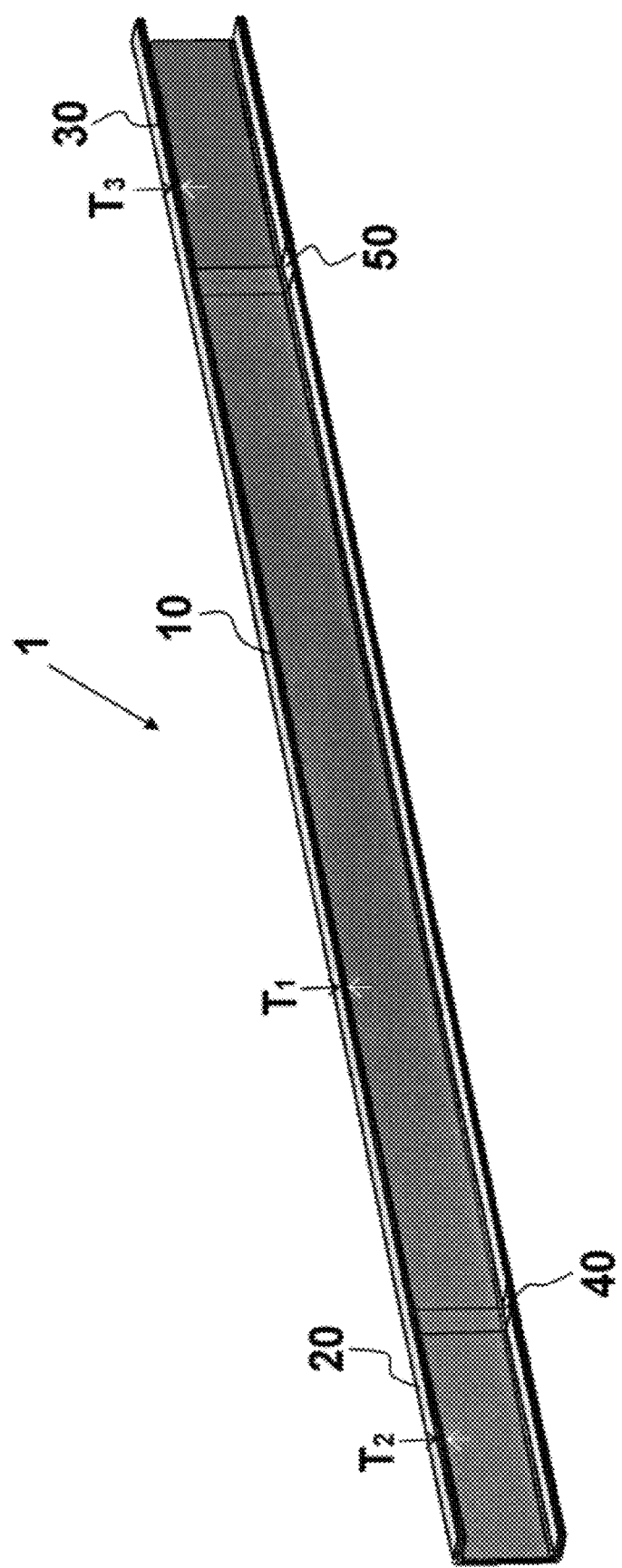
FIG. 1 is a perspective view of a C-shaped member having a cross-sectional shape varied along the longitudinal direction formed according to the present invention.
Figure 2:
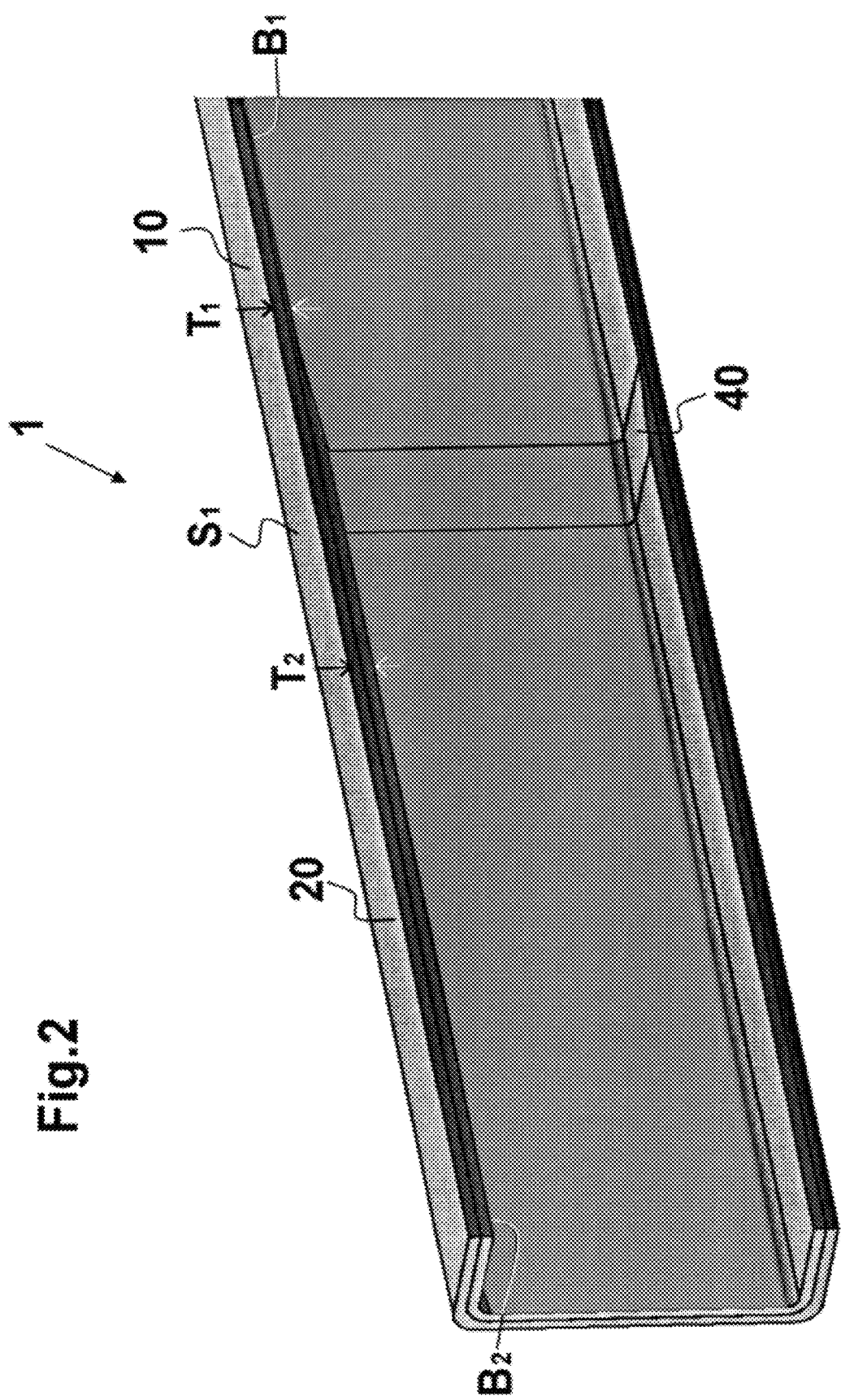
FIG. 2 is an enlarged perspective view of the relevant portion of FIG. 1.

FIG. 1 is a perspective view of a C-shaped member having a varied cross-sectional shape along the longitudinal direction formed according to the present invention, and FIG. 2 is an enlarged perspective view of the relevant portion thereof.

The C-shaped member denoted as a whole by reference number 1 is composed of a first cross-sectional portion 10 disposed at the center area, and a second cross-sectional portion 20 and a third cross-sectional portion 30 formed continuously on both sides of the first cross-sectional portion 10.

The first cross-sectional portion 10 is formed as a C-shaped member having a thickness of $T_1$, for example, and the second cross-sectional portion 20 is formed as a C-shaped member having a thickness of $T_2$. Similarly, the third cross-sectional portion 30 is formed as a C-shaped member having a thickness of $T_3$.

The thickness $T_1$ of the first cross-sectional portion 10 is smaller than the thickness $T_2$ of the second cross-sectional portion 20. The front surface side of the first cross-sectional portion 10 and the second cross-sectional portion 20 constitutes a flat planar surface $S_f$, and only the thicknesses of the rear surface $B_1$ of the first cross-sectional portion 10 and the rear surface $B_2$ of the second cross-sectional portion 20 differ. The rear surfaces thereof are connected via a slanted surface 40.

The first cross-sectional portion 10 and the third cross-sectional portion 30 have a similar structure.

Figure 3:
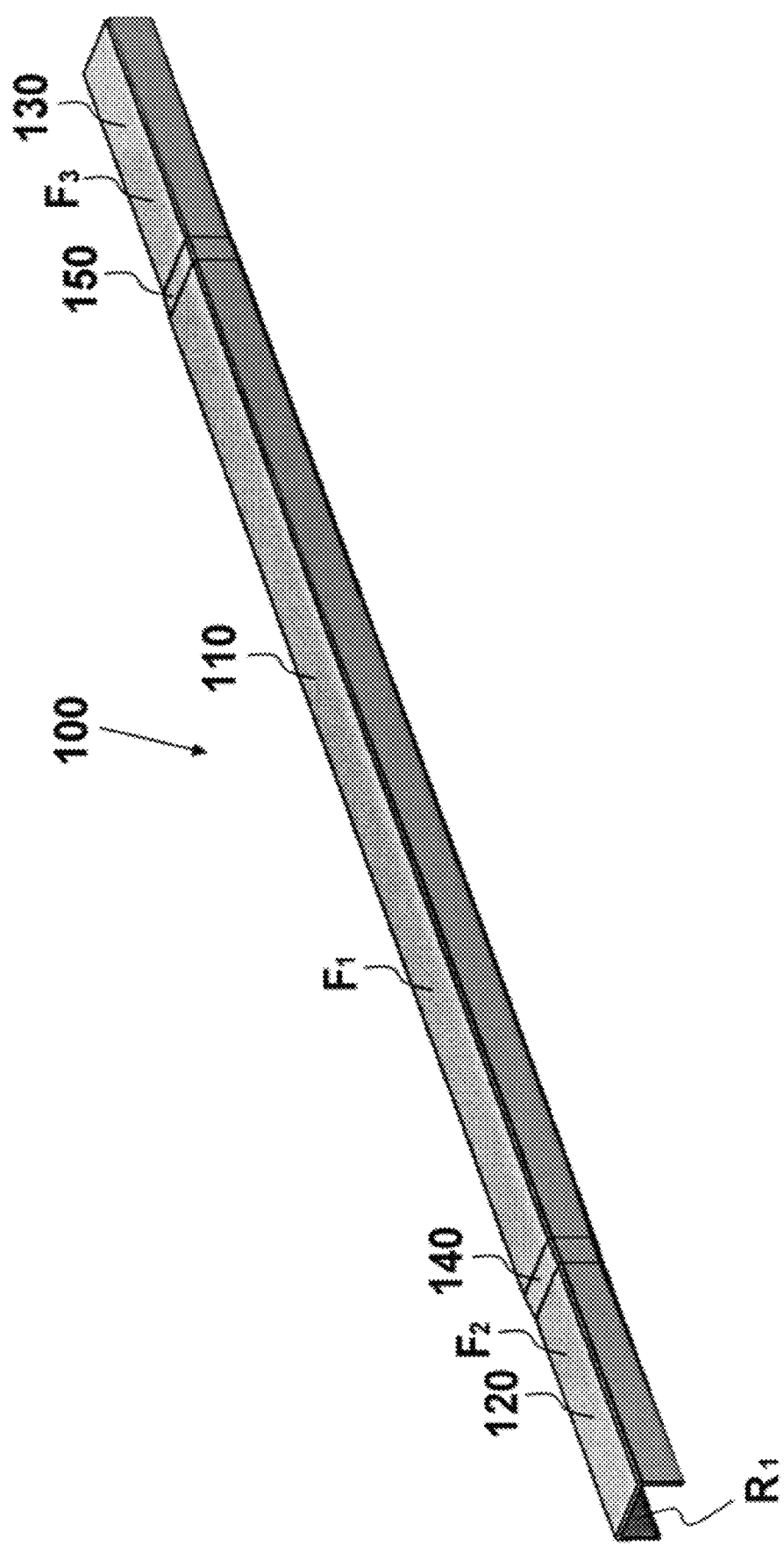
FIG. 3 is a perspective view of the movable mold.
Figure 4:
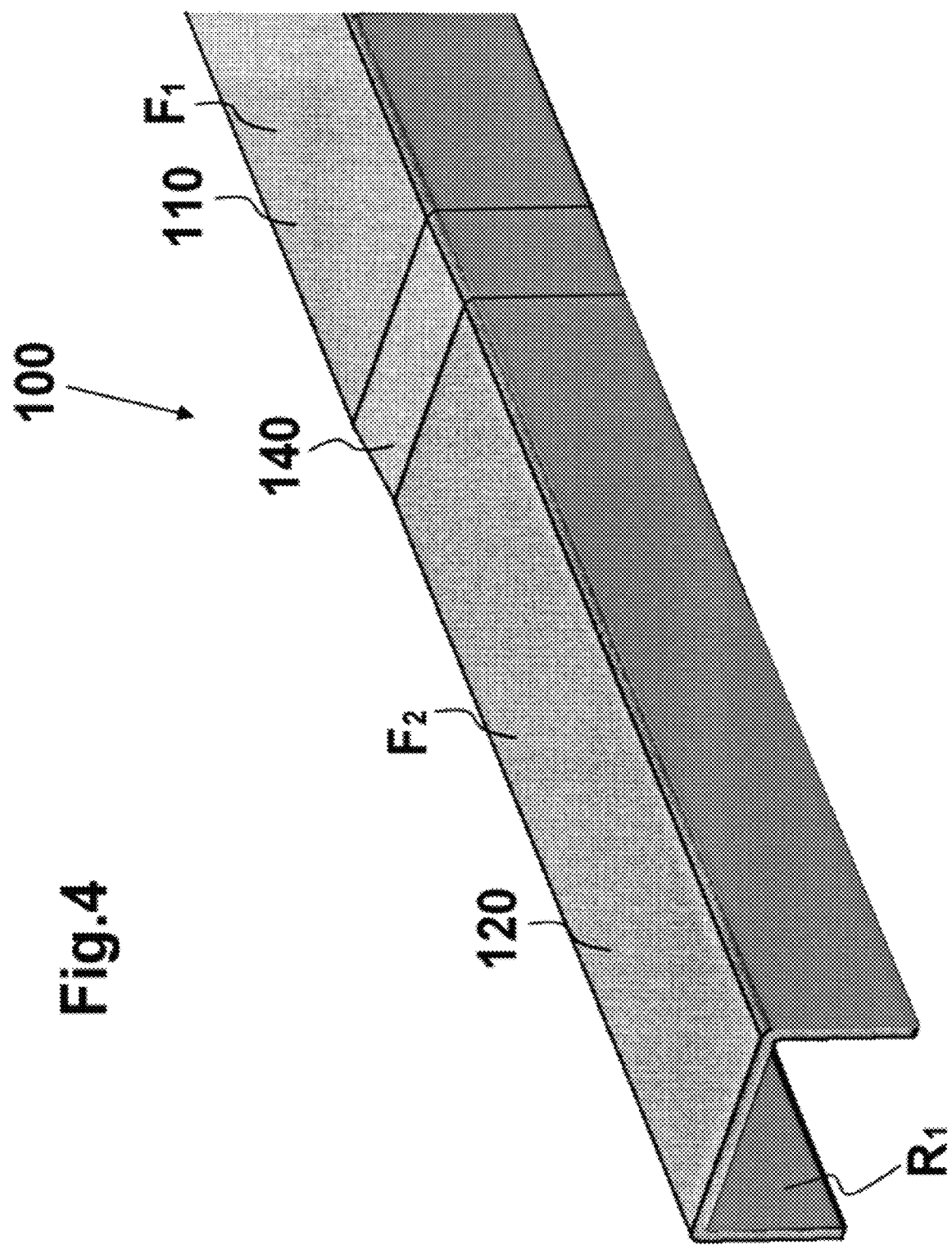
FIG. 4 is an enlarged perspective view of the relevant portion of FIG. 3.

FIG. 3 is a perspective view of a movable mold used for continuously forming the C-shaped member having the above-mentioned cross-sectional structure, and FIG. 4 is an enlarged perspective view of the relevant portion thereof.

The movable mold shown as a whole by reference number 100 has a C-shaped cross-section, and comprises a first mold portion 110 disposed at the center area, and a second mold portion 120 and a third mold portion 130 disposed continuously on both sides of the first mold portion 110.

The inner wall surface $R_1$ of the C-shaped movable mold 100 is composed of a flat planar surface.

The outer surface $F_1$ of the first mold portion 110 has a greater height and a greater width than the second mold portion 120, and is connected to the second mold portion via a slanted portion 140.

Similarly, the surface $F_3$ of the third mold portion 130 has a smaller height and a smaller width than the surface $F_1$ of the first mold portion 110, and is connected to the first mold portion via a slanted portion 150.

Then, an arbitrary number of prepreg sheets are laminated on the surface $F_2$ of the second mold portion 120, the surface $F_3$ of the third mold portion 130 and the surface $F_1$ of the first mold portion 110 as a pre-lamination process, so that the surface of the whole laminated prepreg sheets constitute a single plane.

FIG. 5 is an explanatory view illustrating the forming method according to the present invention.

Prepreg sheets 300 wound around a plurality of rolls 210 and 220 are drawn out for a given length per a given time via a puller device 270 disposed at the end of a lower stream side, and sent to a preforming device 230.

The prepreg sheets 300 are formed into a preform member 310 having a C-shaped cross-sectional shape and uniform thickness while being passed through the preforming device 230.

Next, a movable mold 100 having a given prepreg sheet 320 pre-laminated on it is superposed on the inner side of the preform member 310.

The preform member 310 and the movable mold 100 are sent to a hot press device 250 to be subjected to the subsequent process in the superposed state.

The hot press 250 comprises a lower die 252 and an upper die 254 corresponding to the cross-sectional shape of the C-shaped member, and simultaneously presses and heats the preform member 310 and the prepreg sheet 320 laminated on the movable mold 100 to form an integral member.

The formed member 330 formed in the hot press device is then heated for a given time under a given temperature in an after-cure furnace 260, by which the thermosetting resin impregnated in the prepreg material is completely cured.

The completed member 330 having been completely cured is passed through the puller device 270 and cut into given lengths, and the movable mold 100 is removed therefrom to finish a completed product.

The product is a C-shaped member 1 having a varied cross-sectional shape along the longitudinal direction as shown in FIG. 1.

The lengths and thicknesses of the varied cross-sectional portions of the C-shaped member can be arbitrarily varied by changing the structure of the movable mold.

Further, the present invention can be applied to forming a composite material shape member having various cross-sectional shapes other than the C-shaped member mentioned above, such as an L-shaped member, an H-shaped member or a T-shaped member.

As described, the present invention enables to provide a composite material shape member having the desired strength and having lighter weight.

What is claimed is:

1. A method for continuously forming a composite material shape member having a varied cross-sectional shape by supplying a composite material prepreg having thermosetting resin impregnated in a carbon fiber intermittently in a longitudinal direction and passing the same through a mold and an after-cure furnace, the method comprising:

a step of preparing a movable mold having a cross-sectional shape corresponding to the cross-sectional shape of the shape member, the moveable mold comprising a first mold portion, a second mold portion disposed on one side of the first mold portion, and a third mold portion disposed on an opposite side of the first mold portion, wherein an inner surface of the movable mold is formed of a flat planar surface, an outermost surface of the first mold portion has a greater height and a greater width than an outermost surface of the second mold portion, and an outermost surface of the third mold portion has a smaller height and a smaller width than the second mold portion, wherein the moveable mold is not a peel ply;

a step of pre-laminating composite material prepreg sheets on the outermost surface of the movable mold so that the surface of the whole sheets constitute a planar surface;

a step of passing the prepreg sheets through a preforming device and forming a preform member having an even thickness;

a step of overlapping to an inner side of the preform member the movable mold having a composite prepreg sheet laminated thereto in advance, and subjecting the same to a hot press;

a step of additionally heating the hot-pressed member in an after-cure furnace so as to complete thermosetting; and a step of removing the movable mold from the member having completed thermosetting.

2. A method for continuously forming a composite material shape member having a varied cross-sectional shape by supplying a composite material prepreg having thermosetting resin impregnated in a carbon fiber intermittently in a longitudinal direction and passing the same through a mold and an after-cure furnace, the method comprising:

a step of preparing a movable mold having a cross-sectional shape corresponding to the cross-sectional shape of the shape member, the moveable mold comprising a first mold portion, a second mold portion disposed on one side of the first mold portion, and a third mold portion disposed on an opposite side of the first mold portion, wherein an inner surface of the movable mold is formed of a flat planar surface, an outermost surface of the first mold portion has a greater height and a greater width than an outermost surface of the second mold portion, and an outermost surface of the third mold portion has a smaller height and a smaller width than the second mold portion, wherein the first mold portion is C-shaped, the second mold portion is C-shaped, and the third mold portion is C-shaped;

a step of pre-laminating composite material prepreg sheets on the outermost surface of the movable mold so that the surface of the whole sheets constitute a planar surface;

a step of passing the prepreg sheets through a preforming device and forming a preform member having an even thickness;

a step of overlapping to an inner side of the preform member the movable mold having a composite prepreg sheet laminated thereto in advance, and subjecting the same to a hot press;

a step of additionally heating the hot-pressed member in an after-cure furnace so as to complete thermosetting; and a step of removing the movable mold from the member having completed thermosetting.

\* \* \* \* \*